No. 762,956. PATENTED JUNE 21, 1904.
R. C. TAYLOR.
NON-CHATTERING BRAKE HANGER.
APPLICATION FILED MAY 8, 1903.
NO MODEL. 2 SHEETS—SHEET 1.
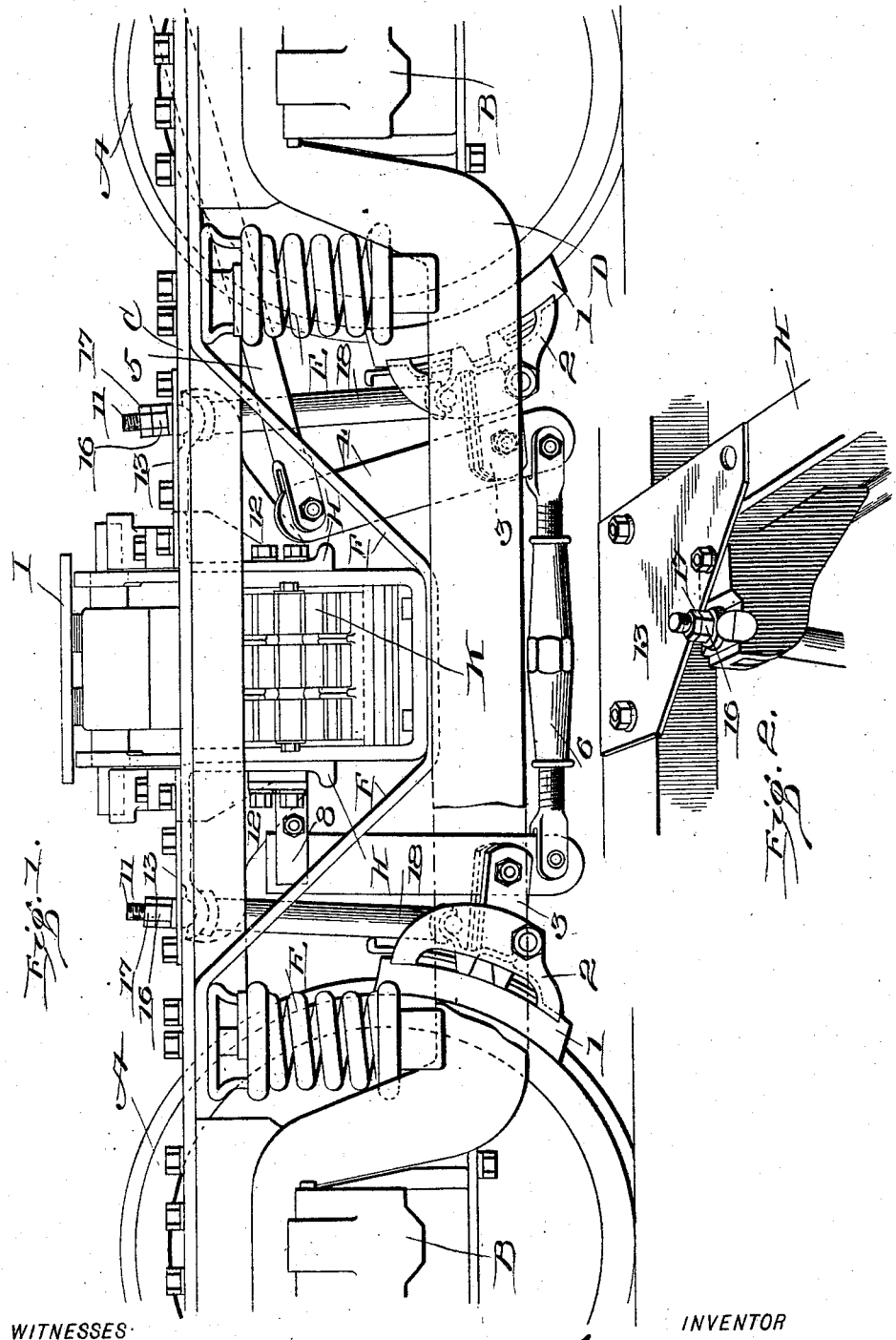

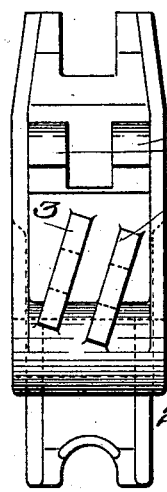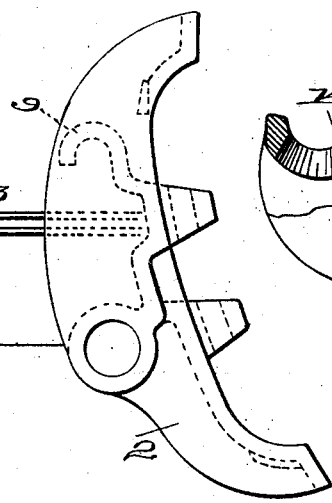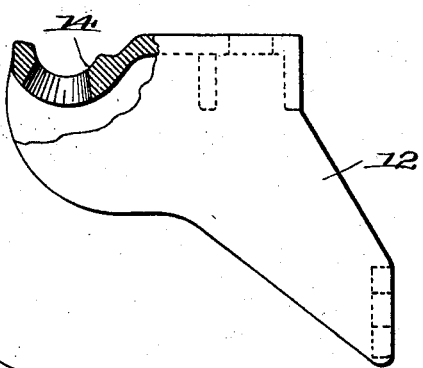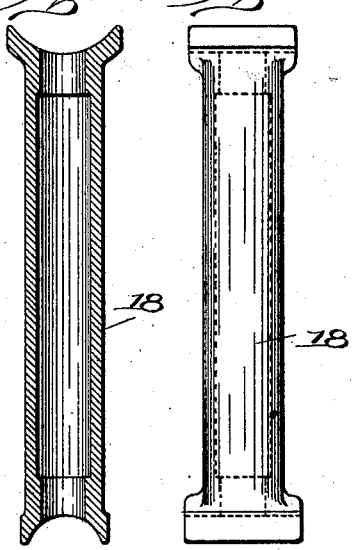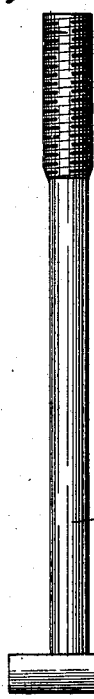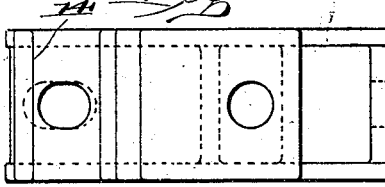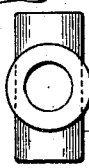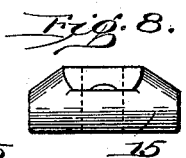

No. 762,956.

Patented June 21, 1904.

UNITED STATES PATENT OFFICE.

ROBERT C. TAYLOR, OF BROOKLYN, NEW YORK.

NON-CHATTERING BRAKE-HANGER.

SPECIFICATION forming part of Letters Patent No. 762,956, dated June 21, 1904.

Application filed May 8, 1903. Serial No. 156,245. (No model.)

*To all whom it may concern:*

Be it known that I, ROBERT C. TAYLOR, residing in the borough of Brooklyn, in the county of Kings and State of New York, have invented certain new and useful Improvements in Non-Chattering Brake-Hangers, of which the following is a full, clear, and exact description, such as will enable others skilled in the art to which it appertains to make and use the same.

This invention relates to a suspension device for brake-shoes especially adapted for use in connection with the brake-rigging of a car-truck, but capable of use in a variety of relations. Its object is to provide a link or suspension device which shall be strong, easily assembled and adjusted, not likely to get out of order, and of a construction tending to prevent chattering of the brake-shoes and strain upon the various parts.

Other objects and advantages will appear hereinafter.

The invention accordingly consists in the features of construction, combinations of elements, and arrangement of parts, an embodiment of which will be hereinafter described and the novel features thereof pointed out in the claims.

In the accompanying drawings, Figure 1 is a view in side elevation of a truck equipped with my improved link suspension for the brake-heads. Fig. 2 is a perspective showing a detail of the truck-frame and the means for suspending the upper end of the link therefrom. Figs. 3 and 4 are details in rear and side elevation, respectively, of a brake-head. Figs. 5 and 6 are details in side elevation and top plan, respectively, of a hanger. Figs. 7, 8, and 9 are details in top plan, side, and end elevation, respectively, of a hanger-block. Fig. 10 is a detail of the suspending bolt or link proper. Figs. 11 and 12 are details in section and side elevation, respectively, of a link-sleeve.

Similar reference characters refer to similar parts throughout the several views.

Referring first to Fig. 1, the truck is shown as equipped with wheels A, journal-boxes B, frame C, equalizer-bars D, equalizer-springs E, truss-bars F, transoms H, a bolster the side bearing of which is represented at I, and bolster-springs K, all of which parts, as well as various others, the precise construction of which is not specifically claimed, may be of any desired or usual construction, that shown being for purposes of illustration only.

Inasmuch as the suspension device is alike at both ends of the truck, a description of one will suffice for both, it being understood that there is such a suspension device in connection with each brake-shoe and that it is adapted to be used in connection with a brake-beam if it is so desired.

Brake-shoes 1 are shown as carried by brake heads 2, which brake-heads are shown in detail in Figs. 3 and 4 as equipped with two projecting arms 3 3, extending at an angle to the center line of the brake-head, between which is adapted to be pivoted a lever 4, which may be operated by a rod 5, to which power is supplied in any suitable manner. The lower end of this lever is connected by link 6 to a similar lever in connection with the other brake-shoe on the same side of the truck, the upper end of this second lever being pivoted in any suitable bracket from the frame, as at 8. As shown, the brake-head 2 is provided with a projecting member 9 in the form of a downwardly-opening hook, as best shown in dotted lines in Fig. 4. The T-shaped head 10 of link 11 is adapted to be slipped beneath this hook and to find a rocking bearing on the under side thereof. The upper end of link 11 passes through a hanger 12, (shown in detail in Figs. 5 and 6,) said hanger being adapted to be supported from the frame in any desired way, as by bolting it to the transom H and to a gusset 13. The upper face of the hanger 12 is provided with an open socket, as at 14, adapted to serve as a bearing for the hanger-block 15, the lower surface of which is shaped to fit and have a rocking bearing in the socket 14. The link 11 passes through this hanger-block, and it is adapted to be secured in position by adjusting and check nuts 16 17 on the threaded upper end thereof. The upper face of the curved bearing-arm 9 and the lower face of the hanger 12 below the socket 14 are shaped to present rocking or pivoting surfaces for correspondingly-shaped ends of a sleeve 18, which when the parts are assembled, as shown in Fig. 1, loosely surrounds the link 11 and is held between the arm 9 and the lower face of the hanger 12. Hanger 12 for this purpose may be of any suitable construction, but that shown, comprising a casting or web having side flanges, is preferred.

It will thus be seen that I have provided a suspension device for brake-heads which may be easily assembled by placing the link 11 in position with reference to the brake-head, placing the sleeve 18 thereon, and then running the end of the link up through the hanger and hanger-block and adjusting it to any desired degree by turning the nuts. The adjustment for all points of wear—that is, to take up slack at all wearing-surfaces between the brake head or shoe and its ultimate point of support—can thus be made at a single point and by a single operation through the turning of the single adjusting-nut, the use of the check or lock nut being incidental and negligible. While for the purposes of convenience it is preferred that this adjustment should be made at the upper end of the tension member or link 11, it will be obvious that the construction could be so arranged as to bring the adjusting-point at the lower end of the link or at any other desirable point. It has been found in practice that the provision of a sleeve extending between the bearings of the link or link-bolt is very advantageous in the prevention of chattering of the brake-shoes or loosening of the parts. The sleeve provides what may be termed a "compression member," which acts in opposition to the link or tension member, the combined action of the two tending to hold the brake-head securely and prevent chattering or straining. Obviously this member could be made in the form of a sleeve or otherwise to suit the mechanical requirement of the particular structure with which it is associated.

The fact which is especially applicable to devices of the class with which the present invention deals should be obvious that various manufacturers or mechanics might readily modify the details of the construction shown, might substitute elements, and might materially change the appearance of the construction while still availing themselves of the principles and utilities here defined and suggested.

Having described my invention, what I claim as new, and desire to secure by Letters Patent, is—

1. In a suspension device for use in connection with the brake-shoes of vehicles, a suspension-link adapted to be pivotally connected to a brake-shoe and to be pivotally supported from the frame, and a sleeve surrounding said suspension-link and extending between the point of support of the link and its point of pivotal connection to the brake-shoe.

2. In a suspension device for use in connection with the brake-shoes of vehicles, a suspension-link adapted to be pivotally connected to a brake-shoe and to be pivotally supported from the frame, and a sleeve loosely surrounding said suspension-link and extending between the point of support of the link and its point of pivotal connection to the brake-shoe.

3. In a suspension device for brake-shoes of vehicles, in combination, a brake-head, a suspending-link therefor, a support for said link in connection with the frame, and a sleeve surrounding said link and extending between the frame and the brake-head.

4. In a suspension device for use in connection with brake-shoes for vehicles, in combination with the frame and the shoe, a suspension member adapted to be connected to the shoe and to be supported from the frame and an auxiliary member associated with said suspension member and extending between the point of support thereof and its point of connection with the shoe.

5. In a suspension device for use in connection with brake-shoes for vehicles, a suspension member adapted to be connected with a shoe and to be supported from the frame and a single means for adjusting the relation between the brake-shoe, the suspension member and its point of support.

6. In a suspension device for use in connection with brake-shoes for vehicles, a suspension-link adapted to be pivotally connected with a brake-shoe and to be pivotally supported from the frame, a compression member extending between the point of support of the link and its point of connection with the shoe and means for adjusting from a single point the relation of the link and the associated parts at all points.

7. In a suspension device for use in connection with brake-shoes for vehicles, in combination with the frame and brake-shoe, a tension member adapted to support said shoe from the frame and a compression member adapted to apply force to the brake-shoe in opposition to the force of the tension member.

8. In a suspension device for use in connection with brake-shoes for vehicles, in combination with the frame and brake-shoe, a tension member adapted to support said shoe from the frame, a compression member associated with said shoe acting in opposition to the tension member, and means for adjusting the relation between the frame, shoe and tension and compression members.

9. In a suspension device for use in connection with brake-shoes for vehicles, in combination with the frame and brake-shoe, a tension member adapted to support said shoe from the frame, a compression member associated with said shoe acting in opposition to the tension member and a single means for adjusting the relation between the frame, shoe and tension and compression members.

10. In a suspension device for use in connection with the brake-shoes for vehicles, in combination with the frame and brake-shoe, means for supporting the shoe from the frame such that a tension is placed upon the shoe in one direction and means for placing the shoe under tension or compression in opposite direction whereby the force exerted upon the shoe is balanced.

11. In a suspension device for use in connection with brake-shoes for vehicles, in combination with the brake-shoe and the frame, a supporting member having a bearing in connection with the brake-shoe and a second bearing in connection with the frame and a single means for adjusting said member at both of said bearings.

12. In a suspension device for use in connection with brake-shoes for vehicles, in combination with the brake-shoe and the frame, a suspension-link having a bearing in connection with the brake-shoe and a second bearing in connection with the frame, a compression member having bearings in connection with the shoe and the frame, and means for adjusting the relation between said members and their bearings.

13. In a suspension device for use in connection with brake-shoes for vehicles, in combination with the brake-shoe and the frame, a suspension-link having a bearing in connection with the brake-shoe and a second bearing in connection with the frame, a compression member having bearings in connection with the shoe and the frame, and a single means for adjusting said link and compression member in relation to their bearings.

14. In a suspension device for use in connection with brake-shoes for vehicles, in combination with the frame and the brake-shoe, a suspension-link pivotally connected with the shoe and the frame, a sleeve surrounding said link and extending between the shoe and frame and adapted for pivotal movement in relation thereto and a single means for adjusting the relation between said link and sleeve and their points of connection or support with the shoe and frame.

15. In a device for suspending a vehicle-brake shoe, in combination, a brake-head having an open hooked bearing in connection therewith, a T-shaped link having its head fitted beneath said hook-shaped arm and adapted to rock thereon, a hanger supported from the vehicle-frame through which the upper end of said link passes, a rocking bearing for the upper end of said link in connection with said hanger, and a sleeve surrounding said link between said hanger and the hook-shaped arm on said brake-head, the meeting surfaces of said sleeve and the sleeve-hanger and brake-head being shaped to allow pivotal movement therebetween.

16. In a device of the class described, in combination, a brake-head, a hook-shaped arm projecting therefrom, a suspension-link having a head at the end thereof adapted to rest beneath said hook-shaped arm and to have a rocking movement with reference thereto, a hanger providing a bearing for the upper end of said link, and a sleeve surrounding said link extending between said hanger and said brake-head and adapted for rocking movement with reference thereto.

17. In a device of the class described, in combination, a vehicle-frame, a brake-shoe head, a suspension-link pivotally connected to said head, a bearing-block for the upper end of said suspension-link, suitably supported from said frame, and means for adjusting said link with reference to said block.

In testimony whereof I affix my signature in the presence of two witnesses.

ROBERT C. TAYLOR.

Witnesses:
H. M. SEAMANS,
J. B. KNOX.